Figure 5:
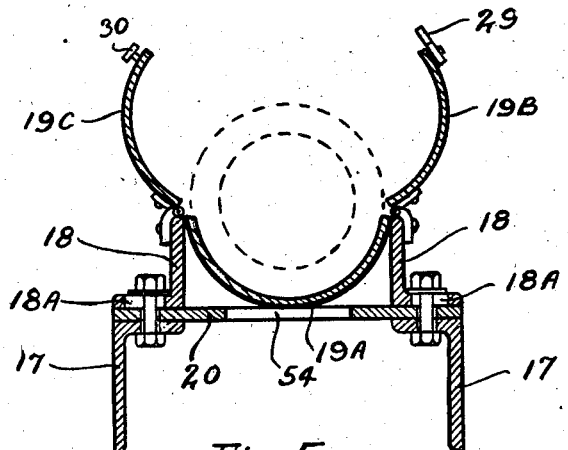

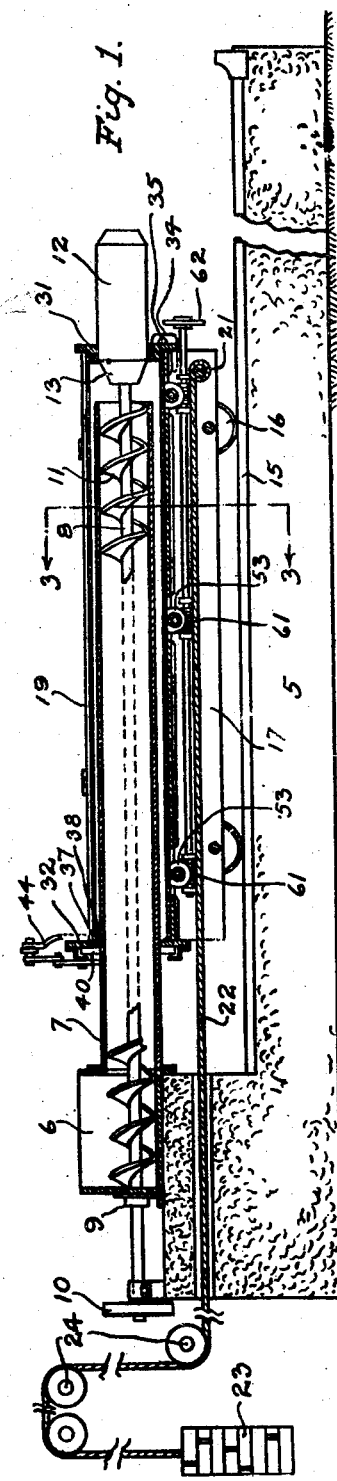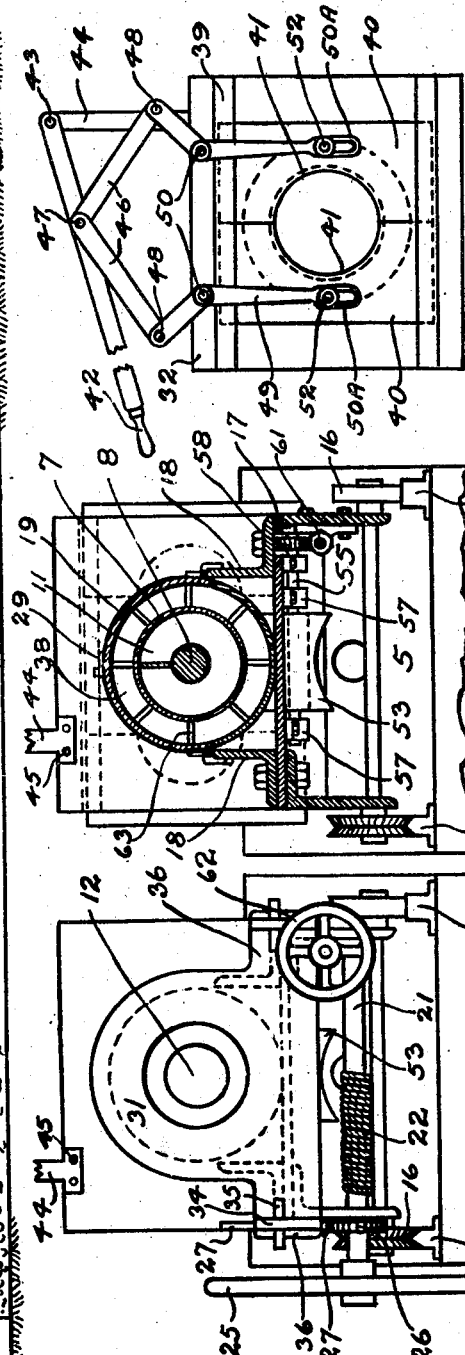

Sept. 17, 1935.  E. H. BISHOP  2,015,001
MACHINE FOR THE MANUFACTURE OF PIPES OR THE LINING
THEREOF WITH CEMENTITIOUS MATERIALS
Filed Sept. 19, 1933  3 Sheets-Sheet 2

INVENTOR
EDWARD H. BISHOP

Sept. 17, 1935.  E. H. BISHOP  2,015,001
MACHINE FOR THE MANUFACTURE OF PIPES OR THE LINING
THEREOF WITH CEMENTITIOUS MATERIALS
Filed Sept. 19, 1933    3 Sheets-Sheet 3

INVENTOR
EDWARD H. BISHOP
By D. P. Wallace Atty

Patented Sept. 17, 1935

2,015,001

UNITED STATES PATENT OFFICE 2,015,001

MACHINE FOR THE MANUFACTURE OF PIPES OR THE LINING THEREOF WITH CEMENTITIOUS MATERIALS

Edward Henry Bishop, Waverley, near Sydney, New South Wales, Australia

Application September 19, 1933, Serial No. 690,128
In Australia September 20, 1932

6 Claims. (Cl. 25—36)

This invention has been devised to provide an improved machine for the manufacture of pipes or the lining thereof with cementitious materials such as cement concrete and or bitumen combined with hardening materials and this machine will "pack" the cementitious material whether as a pipe lining or as a pipe that is the constituent material is moulded under pressure which ensures a very close grained product from which most of the moisture and air is expelled by the machine which also provides an extra smooth bore surface.

This improved machine for the manufacture of pipes or the lining thereof with cementitious material comprises an outer cover or mould (which in the case of a lining would be the pipe itself) a rotatable mandrel or spreader to travel through the mould (whose periphery conforms to the desired pipe bore) a conveyor to project under pressure into said mould adjacent the spreader the pipe making or lining materials and mechanism to draw said mould from said conveyor and said spreader or vice versa as the pipe is formed and in accordance with a predetermined packing of or pressure of the pipe making or lining materials in the mould.

The machine having a suitable foundation has a helical or screw conveyor on a shaft in a cylindrical guide both approximately equal in length to the pipe to be made or lined. At the feeding end is a hopper or bin having a discharge to said conveyor and devices to rotate the conveyor shaft. The guide prevents the cementitious material falling from said conveyor until it is arbitrarily located within the pipe mould or pipe to be lined. The guide may be provided with mechanism to longitudinally vibrate or oscillate it in order to facilitate transit of the cementitious material along the conveyor. The conveyor shaft extends beyond the delivery end of the conveyor and near said delivery end has a rotatable spreader for the pipe making or lining material. Where it is desired to operate the conveyor at a different speed to the spreader as in the case of large pipes (say pipes of twelve inches diameter and greater) the conveyor shaft is tubular and has a shaft therein on the end of which the spreader is mounted. This shaft may be rotated independently from or compounded with the conveyor drive. Balance weights may be provided to exert the required pressure on the being packed cementitious material.

Figures 6, 8:
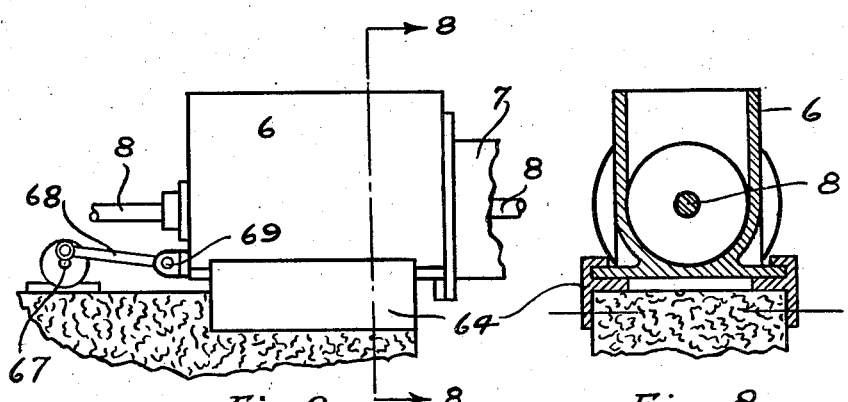
Figure 7:
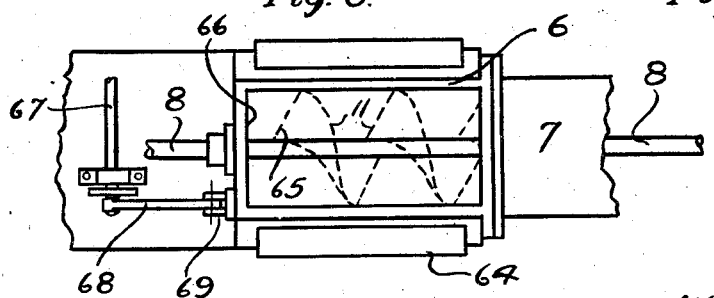
Figures 9, 10, 11, 12:
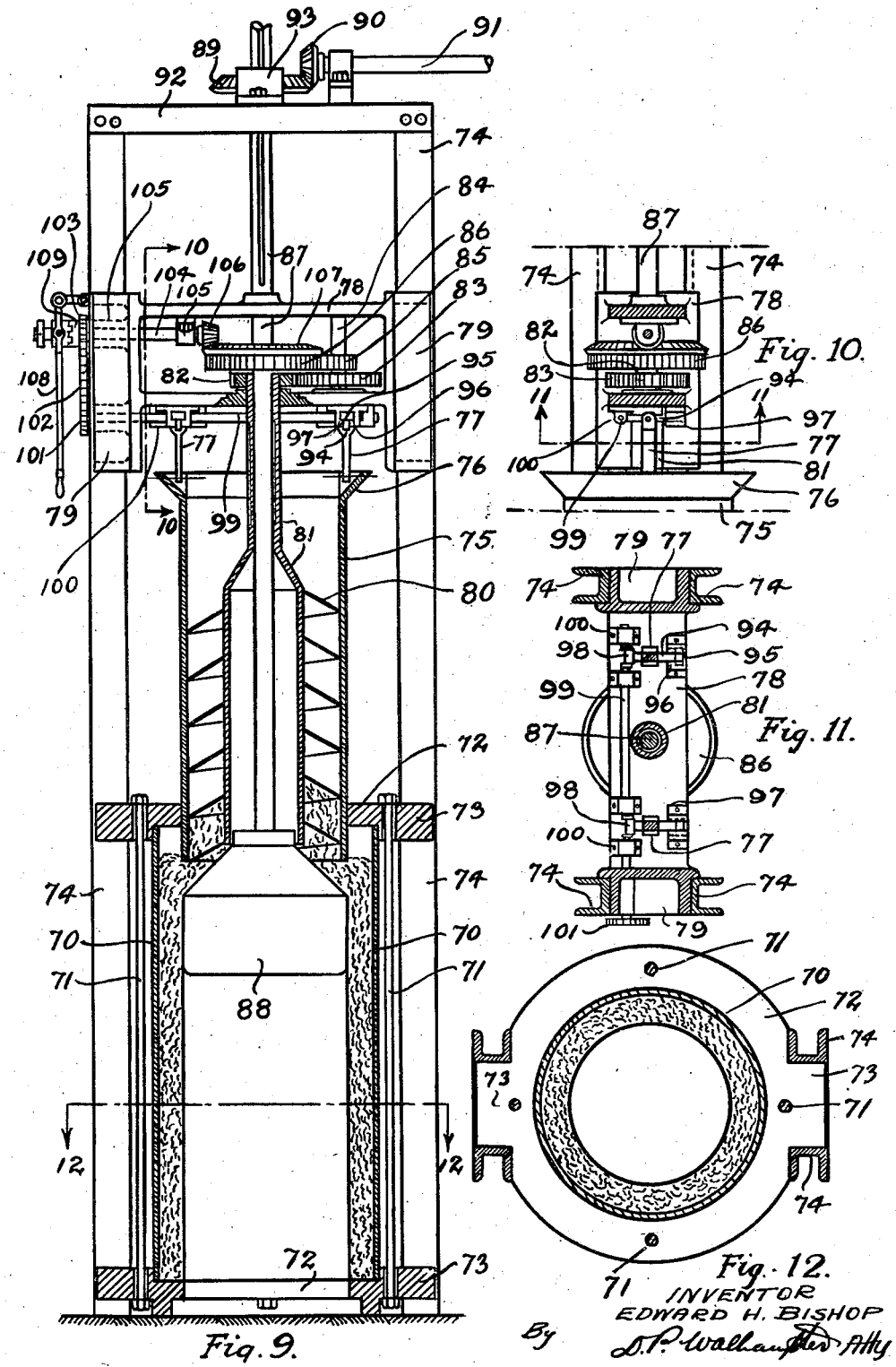

But in order that this invention may be readily carried into practical effect it will now be described with reference to the drawings (which are more or less schematic) accompanying and forming part of this complete specification. Fig. 1 is a medial sectional elevation of the machine as constructed to operate horizontally; Fig. 2 is an end elevation on an enlarged scale thereof looking at Fig. 1 from the right hand end thereof; Fig. 3 is a section (on the same scale as Fig. 2) on line 3—3 in Fig. 1; Fig. 4 is a detail of an end plate for the pipe mould; Fig. 5 is a section of the mould in open position; Figs. 6 and 7 are fragmentary side elevation and plan respectively of a hopper and guide having vibratory mechanism; Fig. 8 is a section on line 8—8 in Fig. 6; Fig. 9 is a part sectional elevation of the machine as constructed to operate vertically having mechanism to effect longitudinally vibration of the guide and different rotatory speeds for the conveyor and the spreader; Fig. 10 is a section on line 10—10 in Fig. 9; Fig. 11 is an inverted sectional plan on line 11—11 in Fig. 10 and Fig. 12 is a sectional plan on line 12—12 in Fig. 9.

Referring to Figs. 1 to 5 the bed or base 5 carries a feed hopper 6 having affixed thereto a guide cylinder 7. The conveyor shaft 8 in bearings 9 extends medially through said hopper and said guide 7 and has rotatory mechanism (such as a gear 10) thereon which is actuated by a motor or the like as well understood. A helical conveyor 11 having the blade set forwardly is mounted on the shaft 8 or on a sleeve thereon and the free end of said shaft is provided with cylindrical spreader 12 having frusto-conical end 13. The degree of taper of the end 13 is approximately as shown in Fig. 1 this taper being important as governing to a large extent the consolidation of the cementitious material.

The bed 5 is stepped as shown in Fig. 1 and on the lower level thereof are two rails 15 for the wheels 16 of a mould truck 17 having longitudinal bearers 18 for the mould 19. The truck 17 athwart its fore end has a winding shaft 21 to which is anchored one end of a cable 22 and on the other end of this cable 22 is suspended a counterbalance weight 23 said cable being reeved around intermediate pulleys 24 as well understood. The shaft 21 has a hand wheel 25 keyed thereon which is provided with a ratchet wheel 26 and a pawl 27 hinged to the side of the truck 17.

The mould 19 is preferably constructed of three arcuate sections 19A 19B and 19C. The mould part 19A rests on the truck floor 20 between the bearers 18 (which bearers may be moved transversely by reason of slotted bolt holes 18A to accommodate moulds of varying sizes) and the parts 19B and 19C are removably hinged to the bearers 18 and are provided with locks to firmly hold the three mould sections in edge to edge contact the locks may consist of hinged hook plates 29 which take on studs 30.

The mould 19 is furnished with end plates 31 and 32 the former having a spigot 33 which neatly fits the bore of the mould and mechanism to clamp it on the end of the truck 17 consisting of angle brackets 34 affixed to said truck and wedges 35 to bear between said brackets 34 and lugs or wings 36 on said plate 31.

The mould end plate 32 has similar mechanism to clamp it to the truck 17 and has a spigot 37 having chamfered inner face 38. On the outer face of the plate 32 are retaining guides 39 for sliding doors 40 said doors each having a semicircular indent 41 therein of the same diameter as the major diameter of the spreader 12. The doors 40 are laterally reciprocable in guides 39 by operation of the hand lever 42 which has fulcrum 43 on standard 44 bolted to the plate 32 as at 45. Thrust rods 46 are pivoted as at 47 to said lever 42 and also have pivotal connections 48 on bent levers 49 which are fulcrumed on pins 50 affixed to the plate 32. The levers 49 have slotted ends 50A which take on pins 52 on the doors 40.

In order to facilitate removal of the mould 19 as when a pipe has been cast therein or when a pipe has been lined rollers 53 are provided these rollers protrude through orifices 54 in the floor of the truck 17 and are freely rotatable on eccentric shafts 55 having medially and eccentrically increased diameters as shown by dotted line at 56. The shafts 55 are freely rotatable in bearings 57 and each on one end has a worm wheel 58 keyed thereon which mesh worm pinions 61 on shaft 61A which is provided with hand wheel 62.

The mould end plate spigots 33 and 37 may have orifices or slots such as 63 therein within which are placed and positioned the ends of longitudinal reinforcing rods if such be desired.

It will readily be seen that when reinforcement is used and that composed of a helical coil having longitudinal spacing bars is preferred it is mounted as a sliding fit on the guide with the ends reeved through the orifices 63. The guides having a diameter which is approximately the mean of the diameters of the spreader and the mould it assures that the reinforcement is positively located medially of the being formed pipe.

Figs. 6, 7 and 8 illustrate mechanism to reciprocate the guide 7 and so agitate the cementitious material during its passage along the conveyor. This is especially useful when the cementitious material is concrete. When this agitating mechanism is incorporated the feed hopper 6 instead of being rigidly affixed to the bed 5 is slidably mounted in a saddle 64 thereon a clearance is provided between the end of 65 of the conveyor 11 and the wall 66 of the hopper. A crank shaft 67 adapted to be rotated by mechanism from the prime motor has a connecting rod 68 to a bearing 69 on the wall 66 of the hopper.

In use the truck 17 is positioned close to the hopper 6 with the cylindrical portion of the spreader 12 just entered into the plate 31 (as shown in Fig. 1) the doors 40 being parted clear of the guide 7. The shaft 8 is rotated and pipe making material fed into the hopper 6 and this is delivered into the mould 19 adjacent the spreader 12 by the conveyor 11. When Portland cement concrete is used only sufficient water is added to the mix to transform the cement particles from the dry powdered state to the colloidal or what may be termed the gelatinous state. As the delivery is continued the pressure of the pipe making material in the mould is increased by the package thereof until such a pressure is reached that the truck 17 together with the mould is gradually traversed away from the hopper and along the bed against the tension of the cable 22 (due to the weight 23).

As the mould is traversed outwardly the rotating spreader compacts the cast pipe-making material and smoothes the interior surface thereof. When the spreader commences to emerge from the mould the doors 40 are closed thereon to seal the end of the mould and so prevent escape of the cast material.

It is found in practice that the application of pressure to the cementitious material during the casting thereof causes the major portion of the moisture and air to be squeezed therefrom and results in a pipe or lining which is so firm (prior to setting) that the pipe can be removed from the mould almost immediately after casting. To effect such removal the weight 23 is lowered to rest by operation of the pawl 27 and the hand wheel 25. The mould parts 19B and 19C are then swung back on their hinges. The end plates 31 and 32 are removed and the hand wheel 62 is rotated which through the intermediate gearing rotates the eccentric shafts 55 and causes the rollers 53 to rise and so lift the mould part 19A together with the case pipe clear of the bearers 18 when the pipe on the mould part 19A may be removed from the machine.

For the manufacture of large pipes as say those exceeding twelve inches internal diameter the work is greatly facilitated by erecting the machine on a vertical axis. This arrangement of the machine entails some minor structural alterations as depicted in Figs. 9, 10, 11 and 12. Referring to these figures. The cover mould 70 preferably constructed of a plurality of arcuate sections lugs 73 neatly but slidably fitting between vertical guide standards 74. The guide 75 has a hopper 76 to which is pivoted hangers 77 whereby the guide is suspended on a saddle or crosshead 78 which also has side lugs 79 which neatly but slidably fit between the standards 74. The conveyor 80 is mounted on a tubular shaft 81 (having top bearing in the saddle 78) and has keyed thereto pinion 82 meshing gear 83 on lay shaft 84 said lay shaft 84 having pinion 85 meshing gear 86 on shaft 87.

The shaft 87 is rotatable within the tubular shaft 81 and has a spreader 88 affixed to its end. The said shaft 87 is rotated by bevel wheel 89 meshing bevel pinion 90 and driving shaft 91. The shaft 87 is reciprocatable through the bevel wheel 89 which is retained in position on a brace 92 by a keeper 93. To effect longitudinal vibration or reciprocation of the guide 75 the hangers 77 are pivoted to pitmans 94 which have end lugs 95 homing in runner grooves 96 in brackets 97 affixed to the under face of the saddle 78 and said pitmans 94 each have on one end a bearing 98 on the crank journal of a crank shaft 99 in bearings 100 also affixed on the under face of the saddle 78. The crank shaft 99 protrudes through one side of said saddle 78 and has a sprocket 101 keyed thereon which is rotated by chain 102 from a sprocket pinion 103 on a shaft 104 in bearings 105 having keyed thereon a bevel pinion 106 which meshes bevel gear tooth 107 on the upper face of the gear wheel 86. The sprocket pinion 103 is engaged or disengaged from the shaft 104 by operation of the lever 108 of a clutch 109.

In use the cementitious material is packed in the mould 70 by the conveyor 80 and smoothed by the spreader 88 as previously described with reference to the horizontal machine and as the pressure of the being packed material increases the conveyor 80 together with the guide 75 the spreader 87 and the saddle 78 is raised in the standards 74 the shaft 87 sliding through the bevel wheel 89. The guide 75 is vertically vibrated by operation of the crank shaft 99 said vibration being stopped by disengagement of the clutch 109 when the pipe moulding operation is nearly finished. If required the saddle 78 may be weighted to increase the pressure on the being packed material or said saddle may have cables anchored thereto reeved over fixed pulleys and provided with counterbalance weights if the pressure required is less than that which would be exerted by the weight of the rising machine parts alone.

If desired the saddle 78 may be secured stationary at the top of the standards 74 and the mould is then traversed downwardly away therefrom in such case the top end plate 72 would have cables anchored thereto reeved over fixed pulleys having weights suspended thereon to exert the desired degree of resistance to the downward movement of the mould.

It will be seen that the rotative speeds of the conveyor and the spreader may be varied by adjustment of the ratios of the described gears.

I claim:

1. Improved machine for the manufacture of pipes or the lining thereof with cementitious material comprising a cylindrical cover mould in a plurality of segmental sections adapted to be locked in edge to edge contact, a truck on which said mould is positioned and supported, a feed hopper, a cylindrical guide extending from said feed hopper and adapted to project within said guide, mould a helical conveyor within said hopper and said cover said conveyor projecting beyond the outer end of said guide, a rotatable spreader on the projecting end of said conveyor, removable end closures for said cover mould, one of said closures having a medial orifice of approximately the same diameter as said spreader the other of said closures having a medial orifice to accommodate said guide, said last mentioned closure comprising a pair of sliding doors having semi-circular indents therein, mechanism to actuate said doors, mechanism to operate said conveyor and rotate said spreader, and mechanism to resist outward movement of the mould relative to the guide.

2. A machine for the manufacture of pipe and pipe linings from cementitious material comprising a hollow guide for the material, a conveyor within said guide for advancing therethrough material supplied thereto, said guide having an open delivery end, a spreader carried by said conveyor and disposed outwardly of said end, a hollow mould of greater cross sectional area than said guide to be telescopically engaged over the latter, means mounting said guide and mould for relative longitudinal movement, a closure for the outer end of the mould having an opening to receive said spreader, and closure means at the inner end of the mould movable between a position to accommodate the guide and a position to snugly embrace the spreader when the inner end of the mould reaches a position beyond the outer end of the guide.

3. A machine as set forth in claim 2 in which the mould comprises a plurality of segmental separable sections.

4. A machine for the manufacture of pipe and pipe linings from cementitious material comprising a hollow guide for the material, a conveyor within said guide for advancing therethrough material supplied thereto, a hollow mould of greater cross sectional area than said guide to be telescopically engaged over the latter, a truck, eccentric rollers on said truck supporting said mould, and means for rotating said rollers to raise and lower said mould.

5. A machine as set forth in claim 2 in which the closure means at the inner end of the mould comprises a pair of plates slidably mounted on the mould for movement towards and away from each other and having segmental recesses to provide an opening to accommodate the spreader, and operating means for said plates comprising a pair of levers pivoted intermediate their ends to the mould and at adjacent ends to said plates, respectively, a third lever pivoted to the mould, and links connecting said first mentioned levers with said third lever whereby swinging movement of the latter effects sliding movements of the plates.

6. A machine as set forth in claim 4 in which the eccentric rollers are equipped with worm wheels and in which the truck carries a shaft having worms meshing with said worm wheels whereby rotation of said shaft effects simultaneous rotation of all of said rollers.

EDWARD HENRY BISHOP.